(12) United States Patent
Linge et al.

(10) Patent No.: US 6,702,121 B2
(45) Date of Patent: Mar. 9, 2004

(54) ROTATING SORTING DEVICE AND SORTING METHOD

(75) Inventors: Niels Linge, Karlsruhe (DE); Robert Klein, Pirmasens (DE); Ernst Kölsch, Vinningen (DE); Martin Müller, Vinningen (DE); Michael Dietzel, Pirmasens (DE)

(73) Assignee: psb GmbH Materialfluss + Logistik, Pirmasens (DE)

( * ) Notice: Subject to any disclaimer, the term of this patent is extended or adjusted under 35 U.S.C. 154(b) by 148 days.

(21) Appl. No.: 10/071,249

(22) Filed: Feb. 8, 2002

(65) Prior Publication Data

US 2002/0112996 A1 Aug. 22, 2002

Related U.S. Application Data

(63) Continuation-in-part of application No. 09/566,207, filed on May 5, 2000, now abandoned.

(30) Foreign Application Priority Data

May 8, 1999 (DE) .................................... 299 08 272 U

(51) Int. Cl.[7] ............................................... B65G 47/46
(52) U.S. Cl. ................. 209/707; 198/369.1; 198/369.5; 198/469.1; 198/478.1
(58) Field of Search ............................... 198/369.1, 369.5, 198/469.1, 478.1; 209/707, 919; 414/272, 283, 285

(56) References Cited

U.S. PATENT DOCUMENTS

| | | | | |
|---|---|---|---|---|
| 2,760,620 A | * | 8/1956 | Hull et al. | 198/563 |
| 3,302,804 A | * | 2/1967 | Harris | 414/283 |
| 3,365,083 A | * | 1/1968 | Baumann et al. | 198/369.5 |
| 4,828,102 A | * | 5/1989 | Dotson et al. | 198/588 |
| 5,611,420 A | * | 3/1997 | Heim et al. | 198/371.2 |
| 6,082,521 A | * | 7/2000 | Maier et al. | 198/349.6 |

* cited by examiner

Primary Examiner—Donald P. Walsh
Assistant Examiner—Joseph Rodriguez
(74) Attorney, Agent, or Firm—Friedrich Kueffner

(57) ABSTRACT

A rotating sorting device for sorting packaged goods has one or more linear supply conveyors and a plurality of removal locations arranged circularly about a central axle. One or more linear removal conveyors are positioned between the central axle and the removal locations and are arranged substantially radially. The linear removal conveyor rotates continuously about the central axle. The linear supply conveyor is positioned above or below the linear removal conveyor and has an end portion in a conveying direction of the linear supply conveyor. The end portion has an incline extending downwardly or upwardly toward the linear removal conveyor. A distribution control device controls the linear supply conveyor, the linear removal conveyor, and the removal locations.

19 Claims, 15 Drawing Sheets

ROTATING SORTING DEVICE AND SORTING METHOD

This application is a continuation-in-part of U.S. application Ser. No. 09/566,207, filed May 5, 2000 now abandoned.

BACKGROUND OF THE INVENTION

1. Field of the Invention

The invention relates to rotating sorting devices and a method for sorting packaged or individual pieces of goods. The device comprises at least one linear supply conveyor, several removal locations arranged circularly about a central axis, and a distribution control device.

2. Description of the Related Art

A large number of conventional sorting devices has an oval design. The receiving devices, for example, in the form of transverse conveyor belts, pockets or baskets, for the packaged goods to be sorted circulate in the form of an endless chain. The goods to be sorted are moved onto the oval sorting device laterally at a slant. When passing the desired removal location, the goods to be sorted are removed from the sorting device by overlaying a horizontal or vertical movement onto the transport movement.

Also known, but used less frequently, are sorting devices in which the goods to be sorted are guided on a circular path about a central axis.

Different removal devices are known for removing the goods to be sorted from the sorting device. There are sorting devices in which the removal is carried out by means of a stationarily arranged deflector which is moved into the travel path of the goods to be sorted. Other sorting devices employ removal devices circulating with the rotating sorting device. For example, when the transported goods are placed in baskets or pockets, these baskets or pockets are tilted, lifted, or lowered at the transfer location.

In order to be able to actuate these removal devices circulating with the sorting device (the present invention pertains to such an arrangement), they must be supplied with energy and with control signals. Even though devices with sliding contacts are inexpensive, they are susceptible to disturbances and failure and also to wear and tear. Inductive transmission devices are free of wear and tear, but are not disruption-free, and, first of all, they are expensive.

In general, the number of removal devices is identical to the number of removal locations, respectively, the number of receiving devices for packaged goods.

Finally, it must also be taken into account that the sorting efficiency of the known devices is limited. Each of the goods to be sorted on average reaches its removal location only after completion of half a revolution of the sorting devices. An increase of the sorting efficiency by placing goods to be sorted onto the sorting device at multiple locations is possible, but is rarely realized because of control and construction considerations.

A further important disadvantage of the known sorting devices is that the number of receiving devices of the sorting device is identical or greater than the number of final locations. This is uneconomical especially in the case of complex and expensive receiving devices for the goods to be sorted.

SUMMARY OF THE INVENTION

It is an object of the present invention to provide a rotating sorting device which is of a simple mechanical configuration and enables the use of simple, inexpensive, and reliable transmitting devices for energy and for control signals.

In accordance with the present invention, this is achieved in that at least one linear removal conveyor is positioned between the central axle and the removal locations, in that the removal conveyor is substantially radially oriented and rotates continuously about the central axle, and in that the supply conveyor is positioned below or above the removal conveyor and has an end portion that is upwardly or downwardly inclined toward the removal conveyor.

In the basic variant, the sorting device according to the invention is comprised of any desired number of removal locations which are arranged circularly about the central axle, a stationarily arranged linear supply conveyor, and a linear removal conveyor continuously rotating about the central axle. The linear removal conveyor and the linear supply conveyor are expediently in the form of conveyor belts, roller tables, slides etc. Since the removal conveyor rotates about a central axle, the energy supply and the signal transmission are realized at this location. The rotating configuration can be of a simple, long-lasting construction.

A further advantage is that it is not necessary to provide at each of the removal locations a removal conveyor. It is instead sufficient to start and stop the feeding action of the removal conveyor in a controlled manner.

According to an advantageous configuration of the invention, the transfer location between the supply conveyor and the removal conveyor is positioned in the vicinity of the central axle because here the tangential speed component is small. The transfer location is selected such that the speed with which the removal conveyor passes underneath the transfer location is identical to the transport speed of the supply conveyor. In this manner, the goods to be sorted are optimally transferred.

This is especially true when the supply conveyor and removal conveyor at the transfer location are positioned at an angle of approximately 90° to one another.

An especially problem-free transfer can be realized in that the removal conveyor in the area of the transfer location has a transverse slant which is matched to the incline of the end portion of the supply conveyor.

The end portion of the supply conveyor can be formed as a slide.

According to a further embodiment of the invention the longitudinal axes of the removal conveyors are pivoted against the rotation direction out of alignment with the radial line extending toward the central axle. The advantage of this arrangement is that the combination of tangential and radial movements of the goods positioned on the rotating removal conveyor results in a purely radial movement of the goods at the removal location. The goods to be sorted can thus not miss, even at greater rotational speeds, their removal location.

The same effect can also be achieved by curving the transport path of the removal conveyor.

According to one further embodiment of the invention, several removal conveyors can be provided for increasing the sorting efficiency. In this configuration, they rotate like spokes of a wheel about the central axle and are supplied via the central axle with energy and the control signals.

An increase of the number of removal locations is achieved in that they are arranged on several concentric circles about the central axle. In this case, the removal conveyors are embodied to be of different lengths, to be telescoping and/or linearly movable.

According to a further embodiment of the invention, the removal locations are arranged at different levels. In this configuration, the removal conveyors are embodied so as to have different inclines.

As an alternative, the incline of the supply and/or removal conveyors can also be configured to be changeable in a controlled fashion.

According to one embodiment of the invention the supply and/or removal conveyors are conveyor belts. Alternative embodiments are roller tables or slides.

According to another advantageous embodiment of the invention, a removal conveyor comprises at least one sub conveyor which in itself can be rotated, lifted and lowered, tilted and/or moved. With the aid of such a sub conveyor, the goods to be sorted can be brought by lifting, lowering, rotating etc. into an optimal position for further processing.

According to another embodiment of the invention, each of the sub conveyors can have its own removal location.

According to one embodiment of the invention, the removal locations rotate in a controlled manner about the central axle. With a suitable selection of rotational direction and rotational speed, the transfer from the removal conveyor to a certain removal locations can be accelerated or decelerated as needed.

According to a further embodiment in this context, the removal locations are located on an annular conveyor path. With this measure it is possible to use conventional boxes or baskets as removal locations.

According to an alternative embodiment, the removal locations themselves are embodied as annular, optionally concentrically arranged, conveyor paths.

According to a further embodiment of the invention, the rotating sorting device has at least one tangential conveyor belt correlated therewith. This allows the supply of goods to be sorted to the sorting device as well as the removal of the sorted goods from the sorting device.

According to a preferred further development of the invention, two or more such sorting devices are provided wherein at least one of the removal locations, formed by a slide, a conveyor belt, or a roller table, of one of the sorting devices transfers goods to be sorted to a supply conveyor of the other sorting device. With such a coupling of several sorting devices the number of removal locations and thus the sorting efficiency can be significantly increased.

The sorting devices, depending on the space available, can be positioned adjacent to or above one another.

In order to monitor and control correct transport of the goods to be sorted by the device, suitable sensors are provided on the supply conveyors, the removal conveyors, and/or the removal locations and connected to a computing and control device. First sensors on the supply conveyor(s) detect the features of the packaged goods in order to be able to sort the packaged goods according to sorting specifications. This information is supplied to the computing and control device and a removal location for the packaged goods based on the features of the packaged goods is computed. Second sensors (position transducers) detect an actual position of the packaged goods on the linear supply conveyor(s) and the linear removal conveyors and signal the actual position to the computing and control device. A third sensor is provided to determine the actual angular position of the rotating linear removal conveyors and sends this information to the computing and control unit. The computing and control unit controls, based on the actual position of the packaged goods and the angular position of removal conveyors and the computed target removal location, the supply and removal conveyors.

The present invention also relates to a method of sorting packaged goods. This method comprises the steps of:

identifying features of the packages goods with a first sensor;

computing a removal location based on the features identified by the first sensor;

transporting the packaged goods on a linear supply conveyor to an end of the linear supply conveyor;

transferring the packaged goods onto one of at least four linear removal conveyors rotating continuously about a central axle, wherein the linear supply conveyor and the one of the at least four linear removal conveyors are positioned approximately at a right angle to one another at the transfer location, wherein a transfer speed of the packaged goods is lower than a sorting speed of the packaged goods, and wherein the one of the at least four linear removal conveyors moves at the transfer location relative to the linear supply conveyor at a speed that is identical to a conveying speed of the linear supply conveyor;

conveying the packaged goods radially outwardly on the linear removal conveyors and stopping the packaged goods in a stop position before the packaged goods reach an end of the linear removal conveyors; and holding the packaged goods in the stop position on the linear removal conveyors until the packaged goods have reached the computed removal location and transferring the packaged goods to the removal location.

BRIEF DESCRIPTION OF THE DRAWING

In the drawing:

FIG. 2a is a side view of the sorting device of FIG. 1a;

DESCRIPTION OF THE PREFERRED EMBODIMENTS

Figure 1:
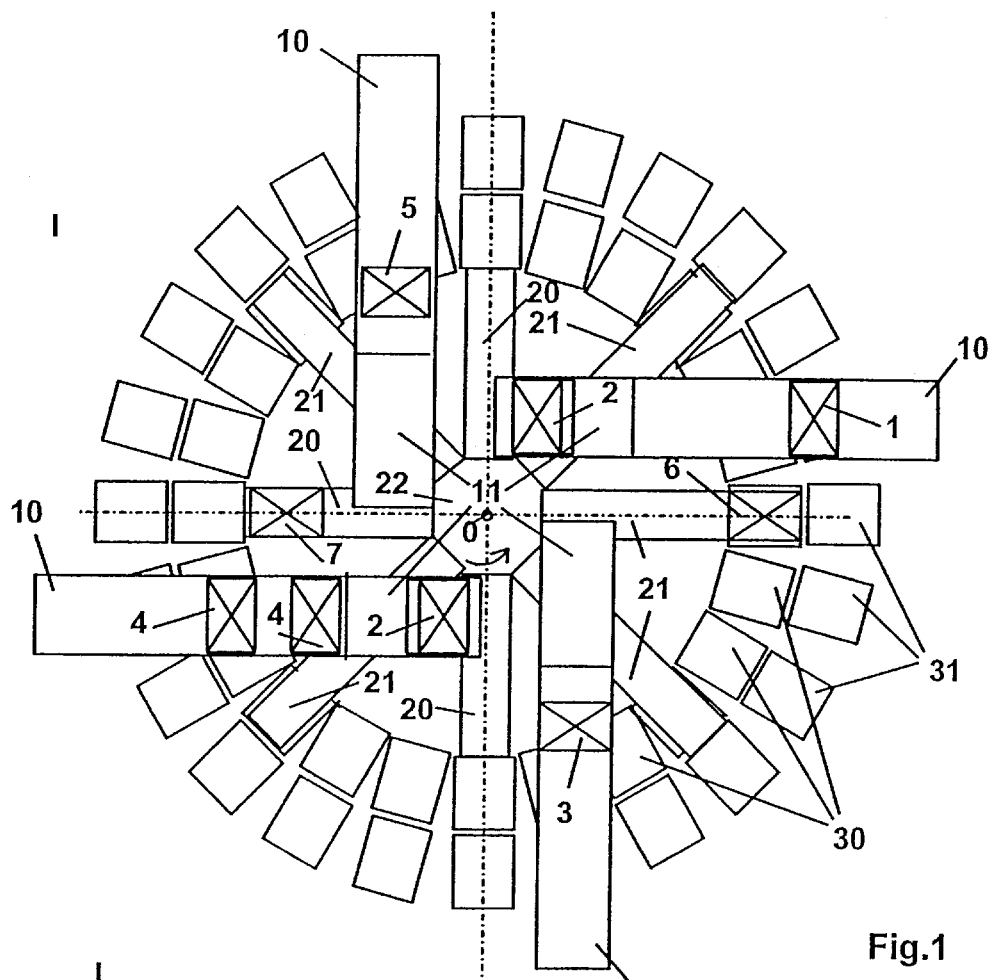
FIG. 1 is a schematic plan view onto a first rotating sorting device according to the invention having four supply conveyors.
Figure 2:
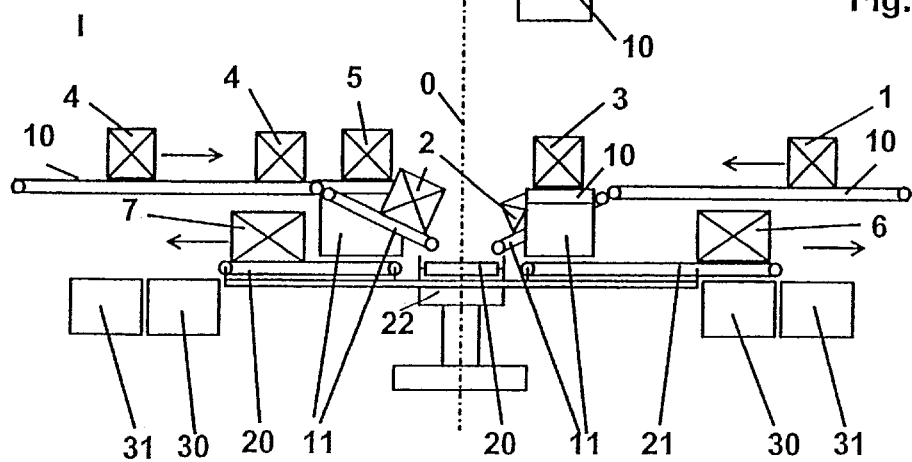
FIG. 2 is a side view of the sorting device of FIG. 1.

FIG. 1 is a plan view and FIG. 2 a side view of a first rotating sorting device I according to the present invention. Removal locations 30, 31 arranged in two concentric circles can be seen which are arranged about the central axle 0. Between the central axle 0 and the removal locations 30, 31 removal conveyors 20, 21 are arranged like spokes of a wheel. The removal conveyors 20, 21 are seated on the hub 22 which rotates continuously about the central axle 0, in the present case counter to the clockwise direction. In order to be able to transfer the goods to the concentric circles of removal locations 30, 31, short removal conveyors 20 and long removal conveyors 21 alternate.

In a plane above the removal conveyors 20, 21 four linear supply conveyors 10 are arranged (FIG. 1). Their end portions 11 incline downwardly from the plane of the supply conveyors 10 to the plane of the removal conveyors 20, 21. At the transfer location the supply conveyors 10, 11 and the removal conveyors 20, 21 are positioned substantially at a right angle. The transfer locations themselves are located in the vicinity of the central axle 0. The precise position of the transfer location is selected expediently such that the speed with which the removal conveyors 20, 21 pass below the transfer location is identical to the conveying speed of the supply conveyors 10, 11.

The goods to be transported 1, 2, 3, 4, 5, 6, 7 are placed onto one (FIG. 1a) or more, for example, four supply conveyors 10, 11 (FIG. 1).

As soon as goods to be transported are transferred from the supply conveyor(s) 10, 11 onto the removal conveyors 20, 21, the latter is actuated so that the goods to be transported can be transported radially outwardly. This is required so that the goods will not collide with the end portion 11 of the subsequently arranged supply conveyors 10. Before the goods reach its end, the removal conveyor 20, 21 is stopped and is started up again only when the desired removal location 30, 31 has been reached. The number of removal conveyors 20, 21 is substantially smaller than the number of removal locations 30, 31 so that overall a very simple mechanical configuration and a simple electronic control result.

Sensors at the supply conveyors 10, 11, the removal conveyors 20, 21, and/or the removal locations 30, 31 monitor and control the transport of the goods to be sorted 1, 2, 3, 4, 5, 6, 7. This will be explained in more detail in the following with the aid of FIG. 1

Figure 1A:
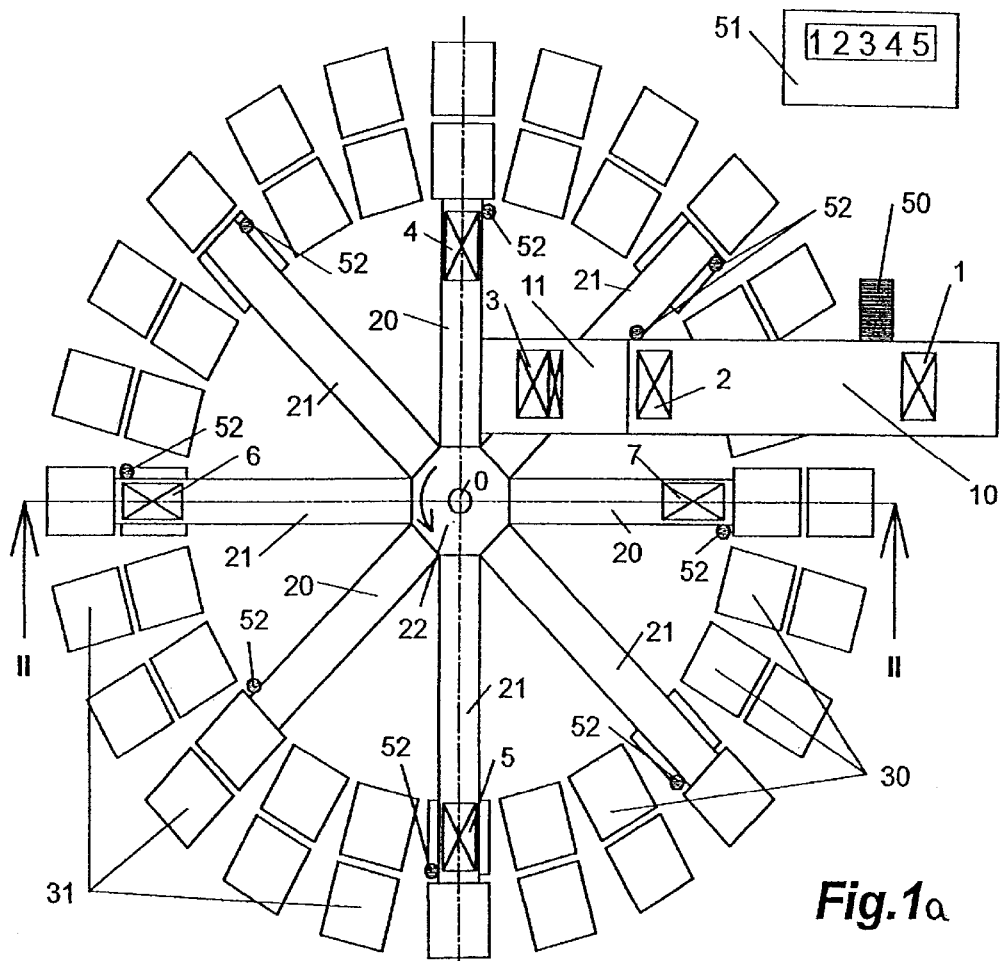
FIG. 1a is a plan view of a modification of the first rotating sorting device according to the invention, provided only with one supply conveyor.
Figure 2A:
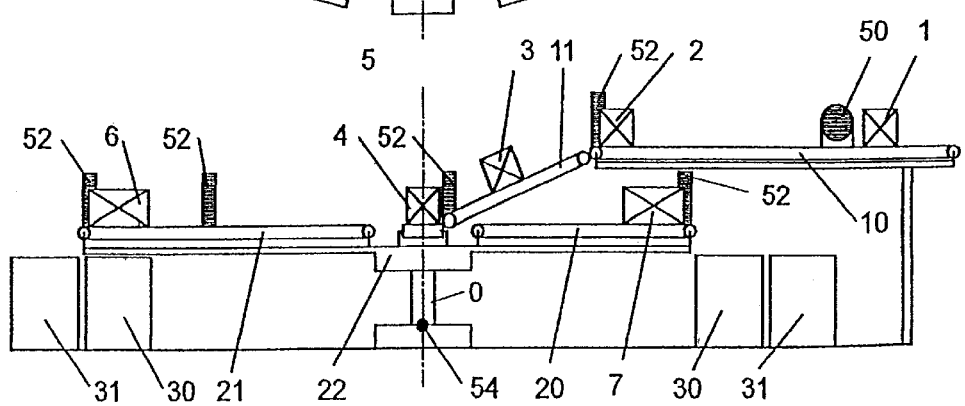
Figure 20:
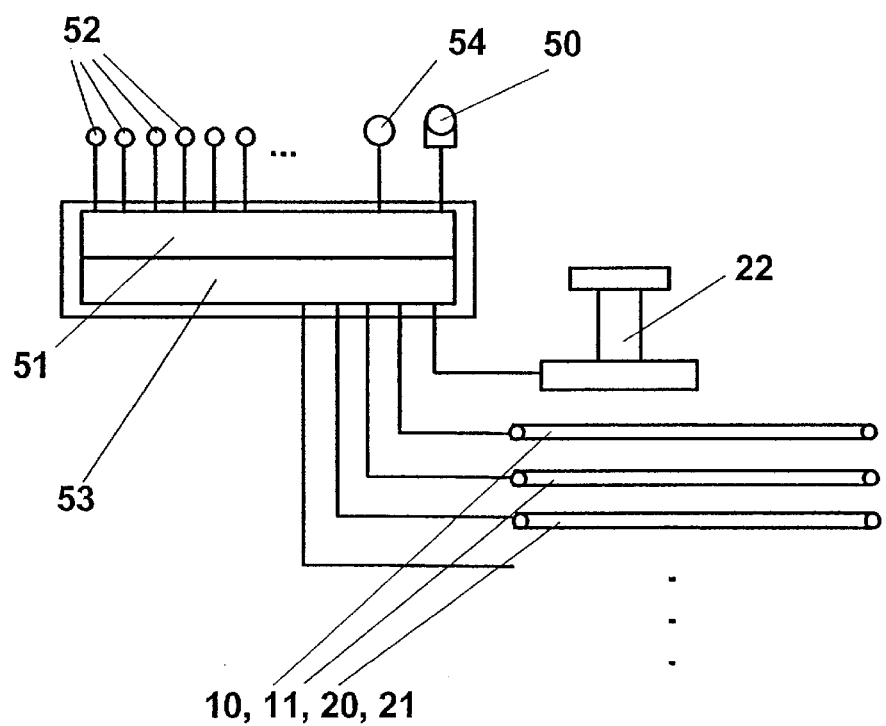
FIG. 20 shows schematically a computing and control device for controlling the sorting device based on data received from the sensors connected to the computing and control device.

FIG. 1a shows a variation of FIG. 1 with only one supply conveyor 10, 11. This illustration also shows sensors 50, 52, 54 provided on the sorting device and cooperating with a computing and control device 51, 53 provided for controlling operation of the sorting device and having a computing unit 51 (FIG. 1a) connected to a control unit 53 (FIG. 20). The sensors 50, 52, 54 and the computing and control device 51, 53 are necessary components of the sorting device; however, since their basic arrangement and function are substantially identical for all sorting devices according to the invention, they are shown in an exemplary fashion only in FIGS. 1a, 2a, and 21.

The sensor 50 (FIG. 1a) is located at the end of the supply conveyor 10, 11 where the goods to be transported are received. The sensor 50 identifies each piece of the goods 1–7 and checks or records the features according to which sorting is to be carried out based on predetermined sorting specifications. The sensor 50 then sends data or signals in regard to the detected properties or features of the piece of goods (1–7) to the computing and control device 51, 53 (see FIG. 20) which, based on the detected features, determines or calculates the target removal location of the scanned piece of goods. In this way, the packaged goods are assigned a target removal location selected based on their features and are thus sorted.

At the end of the supply conveyor 10 and at the end of the removal conveyors 20, 21 additional sensors 52 (FIG. 1a) are provided. In FIG. 1a, the piece of goods 1 has not yet passed the sensor 50, the piece of goods 2 is approaching the sensor 52, while the piece of goods 3 is ready to be transferred at the transfer location. Further goods to be transported 4, 5, 6, 7 are positioned on the removal conveyors 20, 21. The sensors 52 detect the presence of a piece of goods and send this positional information to the computing and control device which, in turn, stops the conveyors 10, 11, 20, 21 so that the goods are held at these locations in a stop position. The conveyor 10, 11 is restarted only when the next removal conveyor 20, 21 (as mentioned above, the removal conveyors 20, 21 rotate continuously about the central axis 0) has reached a position in which a transfer of the piece of goods, currently in the stop position, onto the removal conveyor 20, 21 is possible. Also, the removal conveyor 20, 21 is restarted only when it has reached a position in which a transfer of the piece of goods, currently in the stop position, to the removal location 30, 31 is possible.

In order to determine when a removal conveyor 20, 21 is in a proper position for receiving the piece of goods or transferring the piece of goods to the removal location, an angle sensor 54 is provided on the central axle 0. The sensor 54 determines the momentary angular position of the removal conveyors 20, 21 and sends this information to the computing and control device 51, 53. The computing and control device restarts the supply conveyor(s) or the removal conveyor 20, 21 as soon as the removal conveyor 20, 21 has reached a position for receiving the goods from the supply conveyor(s) 10, 11 or for transferring the goods onto the previously determined target removal location 30, 31 in which position the piece of goods drops precisely onto the removal location 30, 31 according to the parabolic curve of its fall.

The computing and control device 51, 53 is connected to the supply and removal conveyors 10, 11, 20, 21

(schematically shown in FIG. 20) and controls the drive motors of the supply conveyor(s) 10, 11 and of the removal conveyors 20, 21. It ensures that the goods are quickly and reliably transported and transferred in the sorting device to the target removal locations 30, 31.

Figure 3:
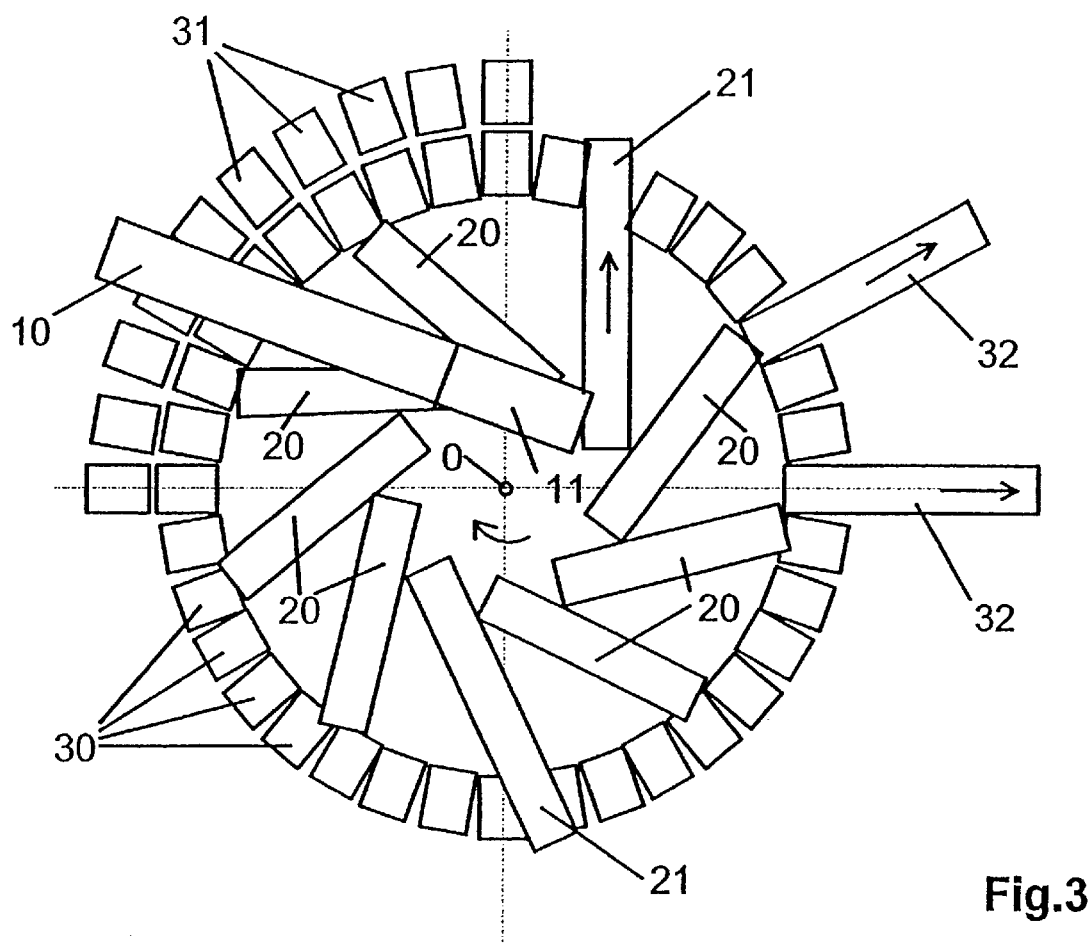
FIG. 3 is a schematic plan view onto a second rotating sorting device according to the invention.

FIG. 3 shows a second embodiment of the rotating sorting device. In this embodiment, the longitudinal axes of the removal conveyors 20, 21 are pivoted relative to the radial line. In this manner, the goods to be sorted perform at the removal locations 30, 31 a purely radial movement. Both features increase the functional safety and reliability. Some removal locations are realized in the form of conveyor belts 32.

Figure 4:
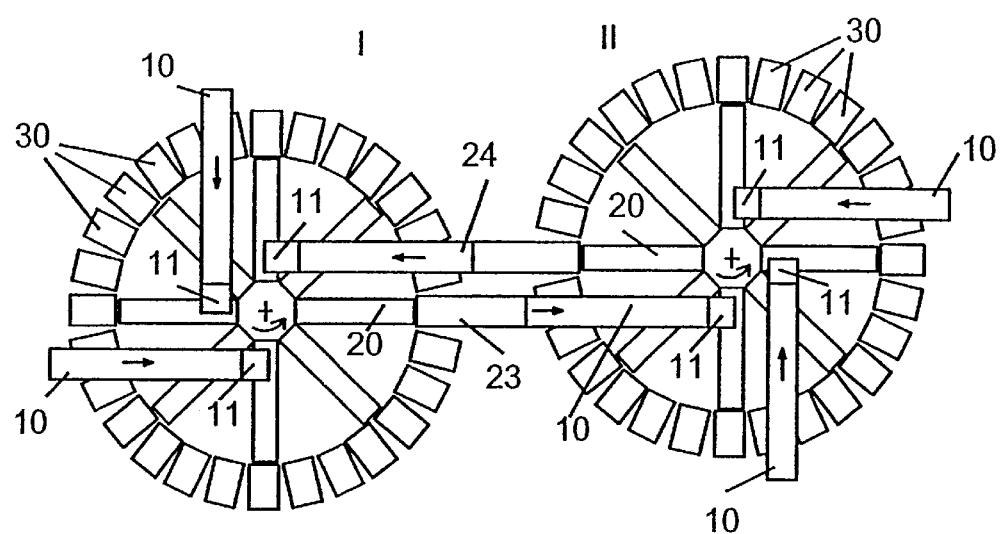
FIG. 4 is a schematic plan view of a sorting arrangement comprised of two adjacently positioned sorting devices according to the invention.

FIG. 4 shows a plan view of a sorting arrangement comprised of two rotating sorting devices I, II. The removal conveyors 20 of the first sorting device I transfer the goods to be transported directly onto a transport device in the form of a first conveyor belt 23 which transports the goods to be transported onto the supply conveyor 10 of the second sorting device II. In the same manner, the removal conveyors 20 of the second sorting device II transfer the goods to be conveyed directly onto a second transport or conveyor belt 24 which transports the goods to be transported onto the supply conveyor 10 of the first sorting device I. This coupling of two rotating sorting devices I, II increases the number of removal locations 30. If it is desired to also increase the throughput of the sorting arrangement, this can be achieved by increasing the number of supply conveyors 10, 11. In this context, the removal conveyors 20, 21 also serve as an intermediate buffer.

Figure 5:
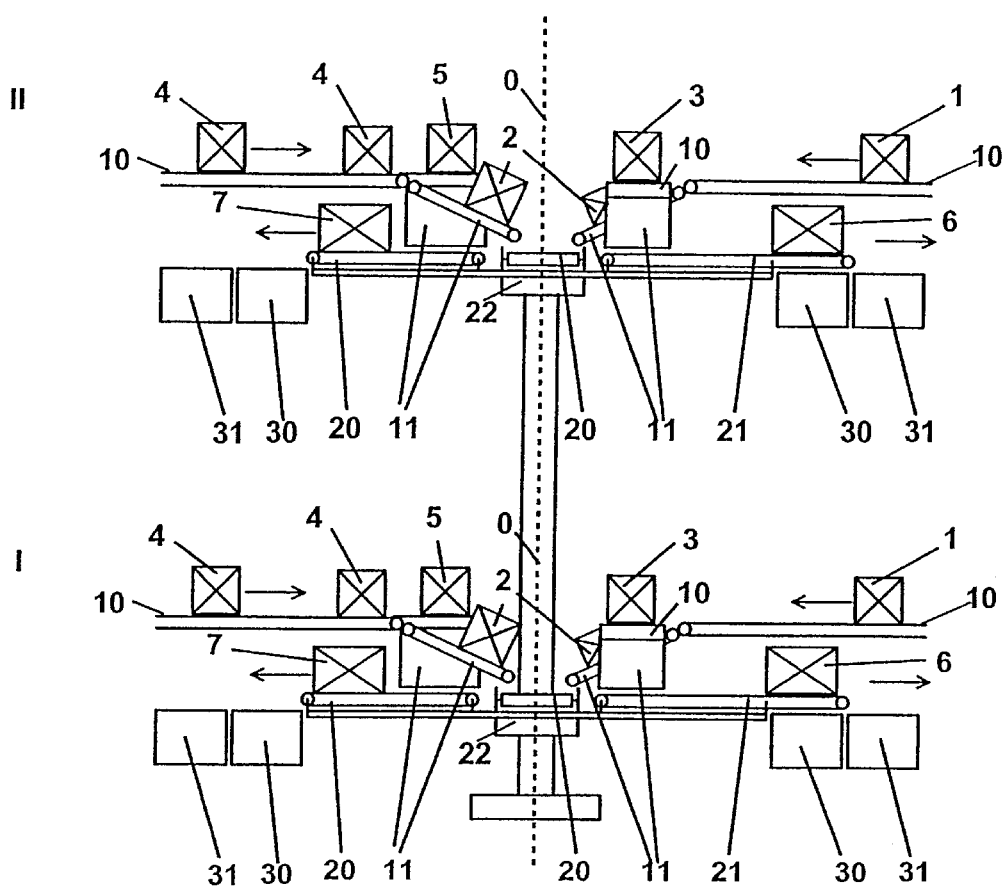
FIG. 5 is a side view of a sorting arrangement comprised of two sorting devices according to the invention positioned above one another.

FIG. 5 shows a sorting arrangement comprised of two rotating sorting devices I, II. In this sorting arrangement, the goods to be transported are also transported by a transport device, for example, a lifting system, from one of the sorting devices I, II to the other sorting device II, I. The end portions 11 of the supply conveyors 10 are realized in the form of slides.

Figure 6:
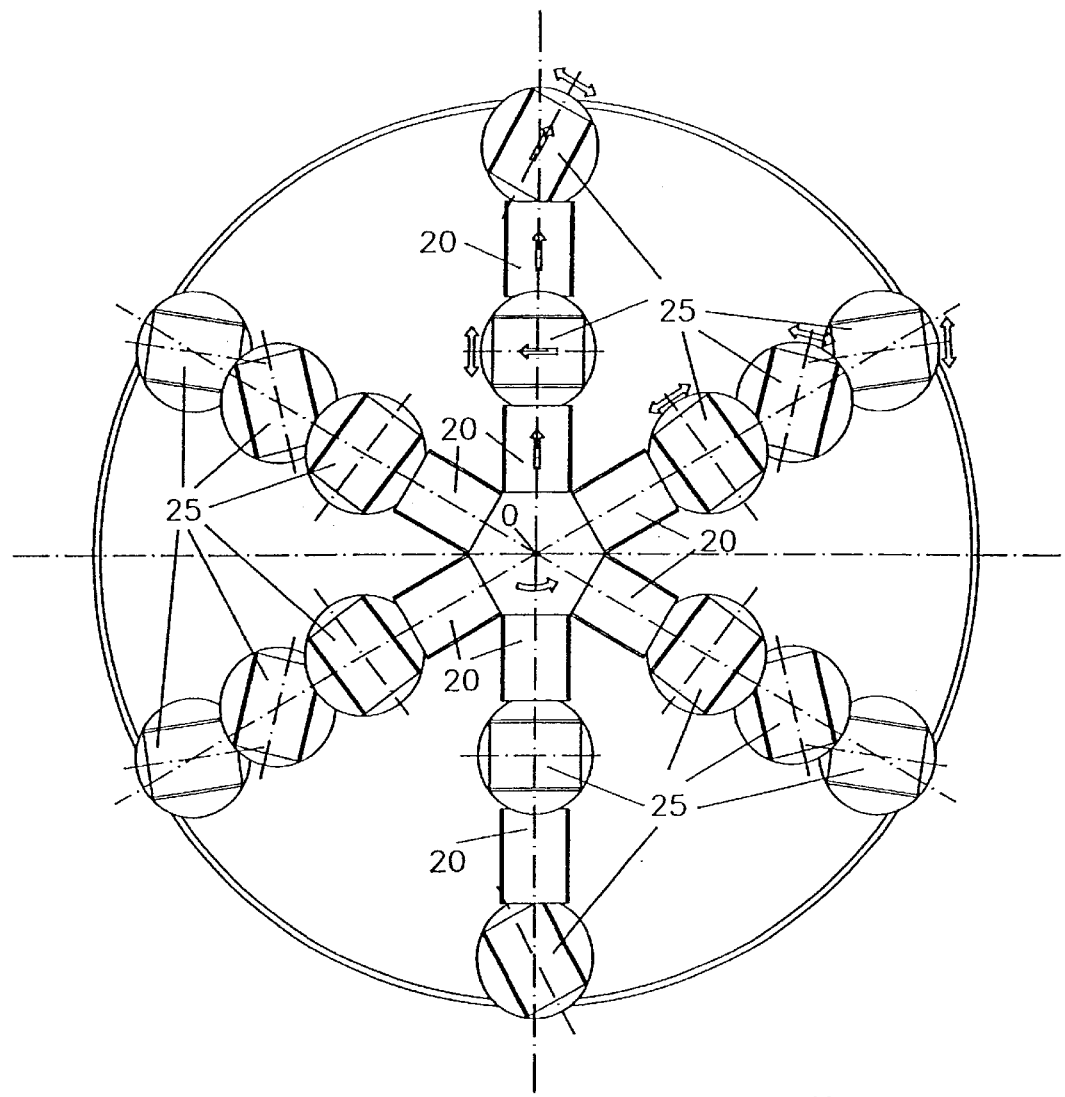
FIG. 6 is a schematic plan view onto a third rotating sorting device according to the invention.

FIG. 6 shows a plan view onto a third rotating sorting device. Shown are six removal conveyors 20 arranged so as to rotate about the central axle 0. Each removal conveyor 20 has two or three sub conveyors 25 which themselves are rotatable, liftable and lowerable, tiltable, and/or movable. These sub conveyors 25 allow to bring the goods to be sorted into an optimal position for further transport.

Figure 7:
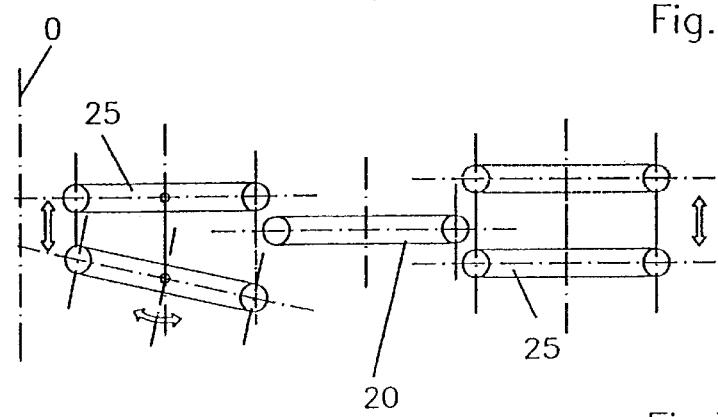
FIG. 7 is a schematic side view of a removal conveyor of the sorting device of FIG. 6.

FIG. 7 shows only schematically a side view of a removal conveyor 20 in FIG. 6. Shown are two sub conveyors 25 of which the one to the right is liftable and lowerable, the one to the left is liftable and lowerable as well as tiltable about its transverse axis.

Figure 8:
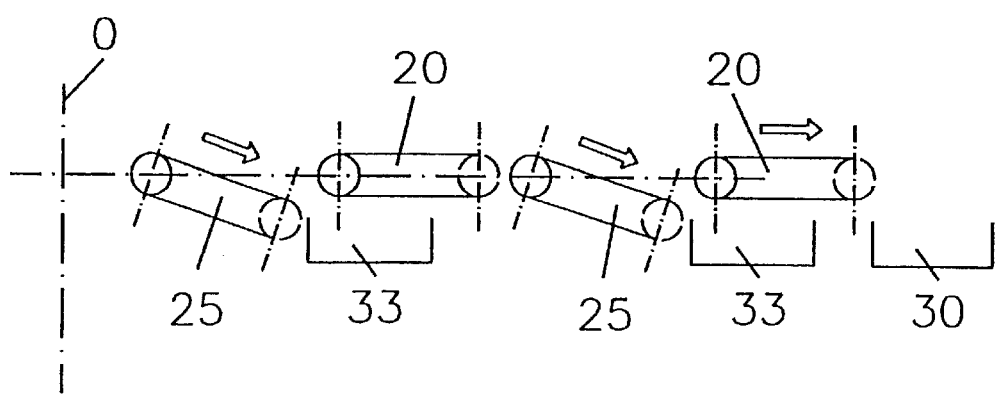
FIG. 8 is a schematic side view of two removal devices of the sorting device according to FIG. 6.

FIG. 8 shows schematically a further removal conveyor 20 of FIG. 6. Two sub conveyors 25 are shown which can be pivoted downwardly out of the plane of the removal conveyor 20. Each sub conveyor 25 has its own removal location 33. This increase of removal locations increase the flexibility of the sorting device.

Figure 9:
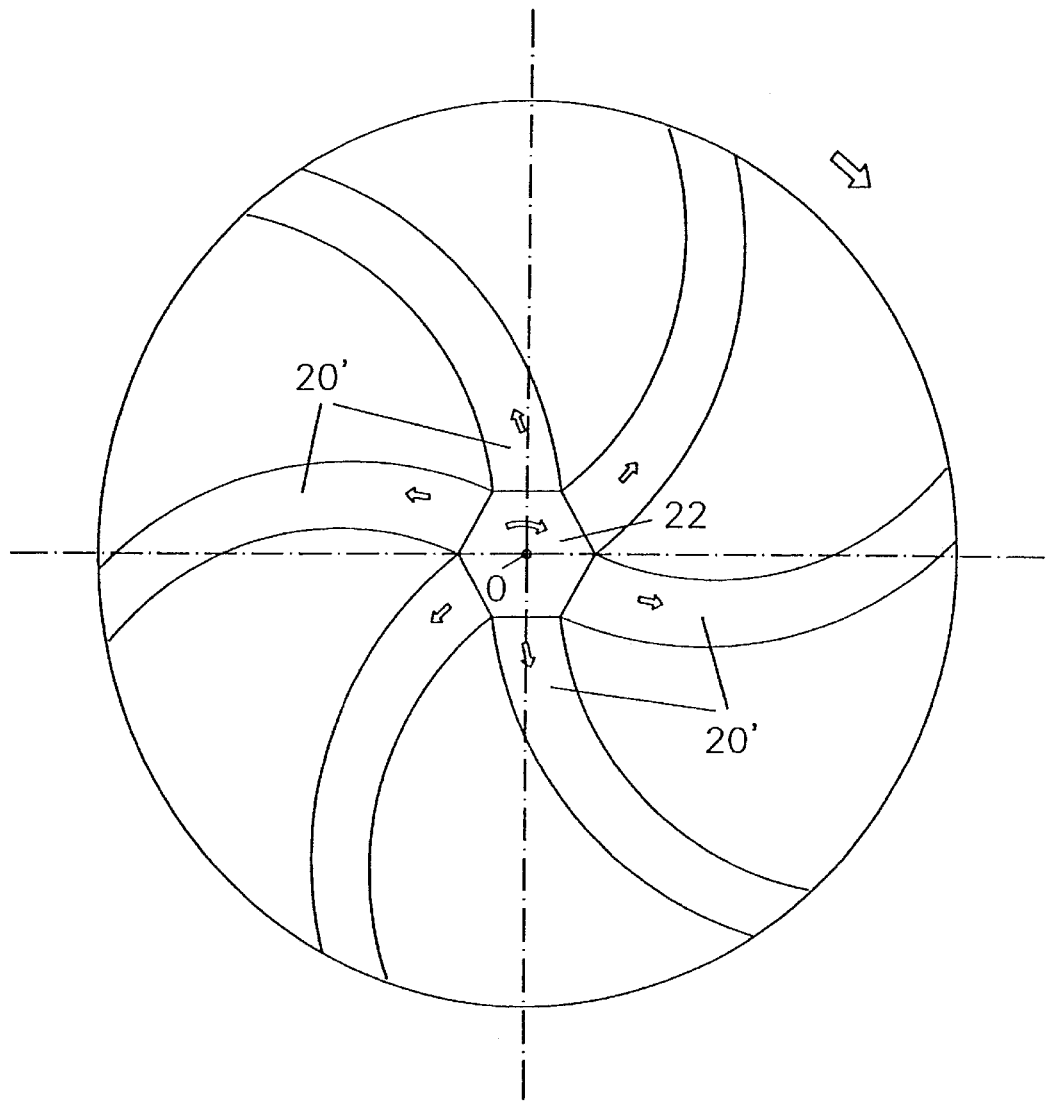
FIG. 9 is a schematic plan view onto a fourth rotating sorting device according to the invention.

FIG. 9 shows schematically a plan view onto a fourth rotating sorting device. Six removal conveyors 20' rotating continuously about the central axle 0 are shown which have a transport path that is curved. With such a curved transport path the radial and tangential speed vectors of the goods to be sorted can be varied at the transfer location within wide ranges.

Figure 10:
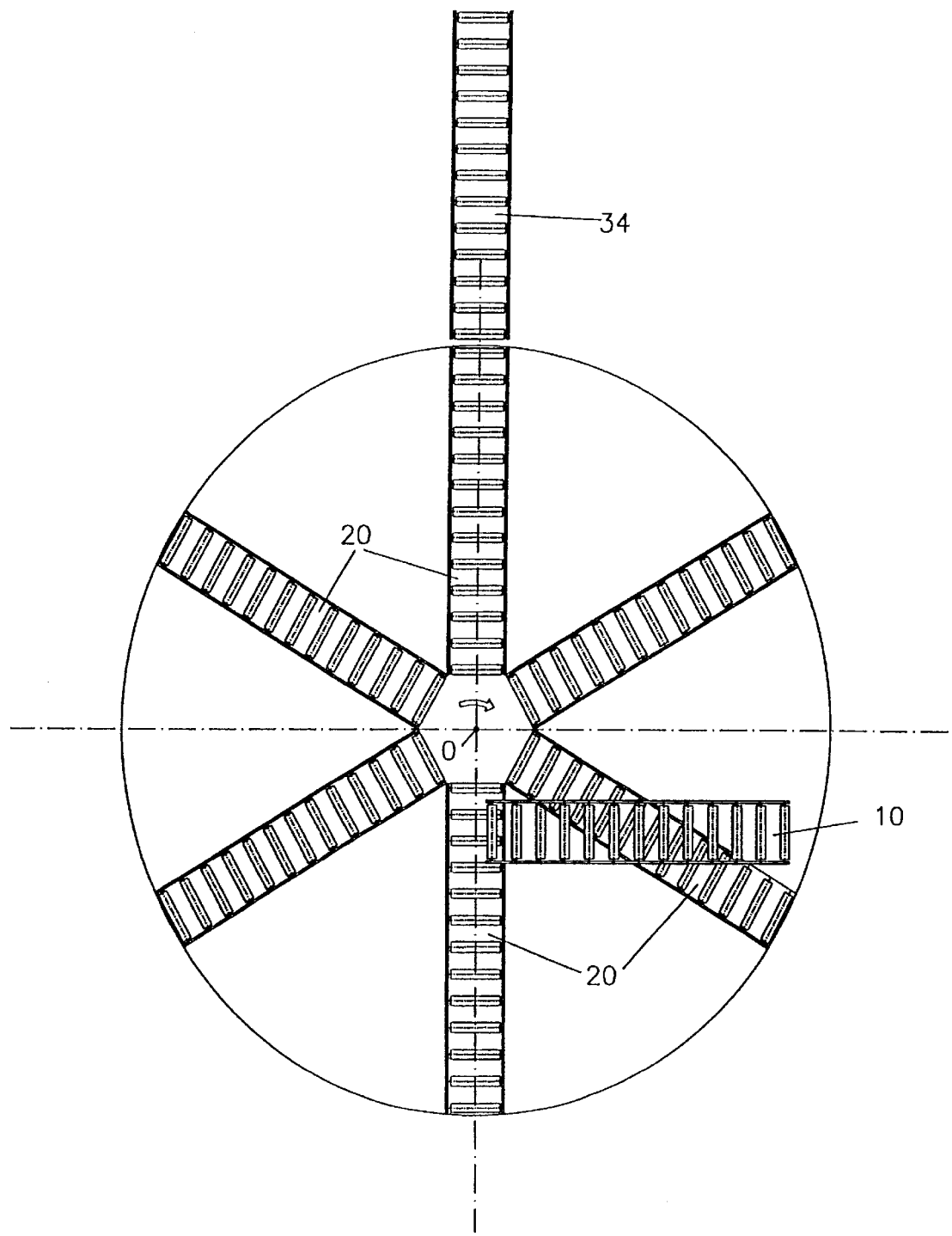
FIG. 10 is a schematic plan view onto a fifth rotating sorting device according to the invention.

FIG. 10 show schematically a plan view onto a fifth rotating sorting device. The supply conveyor 10 as well as the removal conveyor 20 as well as a transport conveyor 34 are embodied in this embodiment as roller tables.

Figure 11:
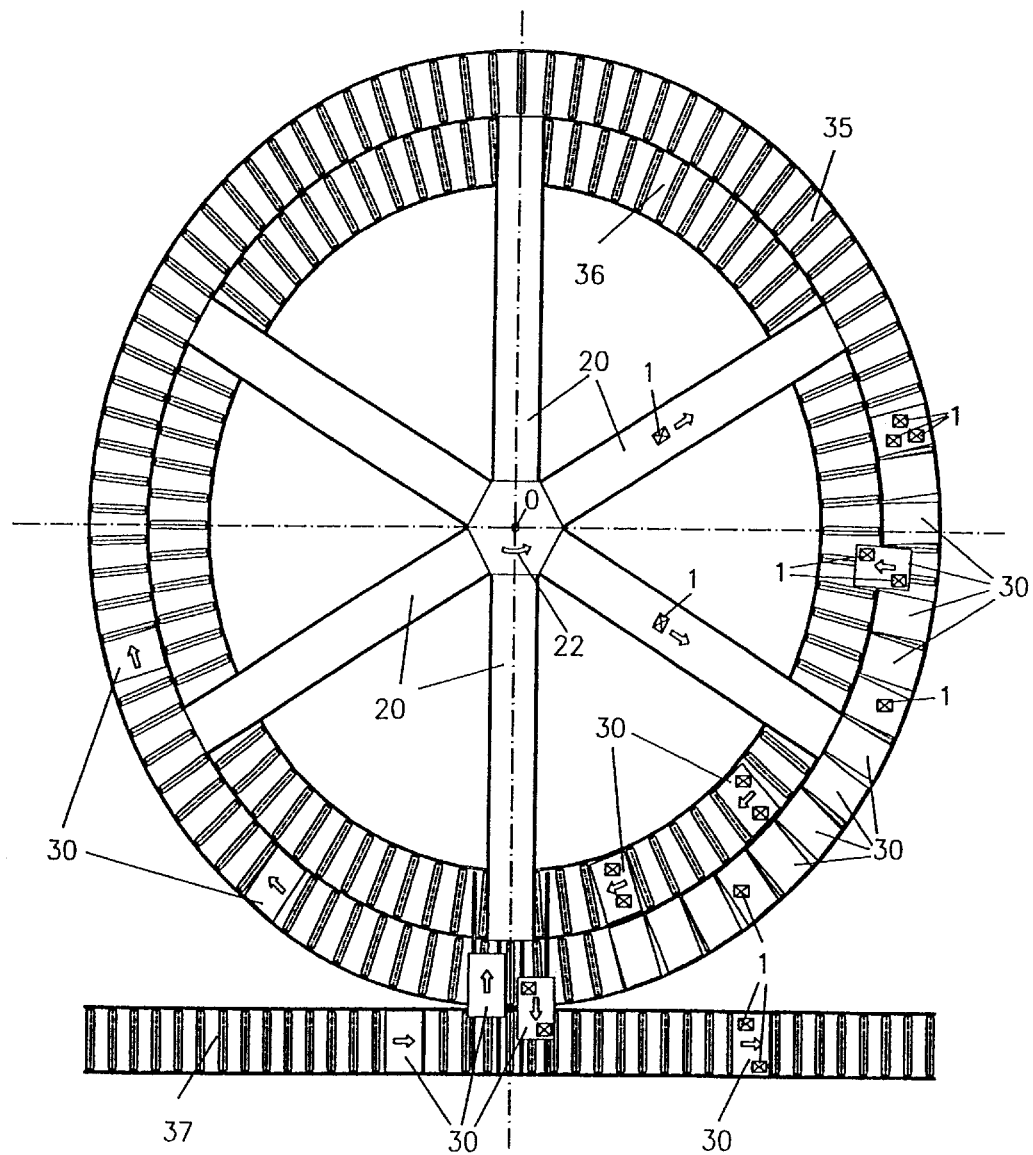
FIG. 11 shows a schematic plan view onto a sixth rotating sorting device according to the invention.

FIG. 11 shows schematically a plan view onto a sixth rotating sorting device. The supply conveyors have been omitted in the drawing in order to simplify the illustration. The removal conveyors 20 rotate continuously about the central axle 0. They transfer the goods to be transported 1 to the removal locations 30 which are positioned on the annular conveyor path 35 which is in the form of a roller table. The goods to be transported can be moved on this roller table.

A second annular conveyor path 36 is provided concentrically to the annular conveyor path 35. Also shown is a tangential conveyor path 37 embodied also as a roller table. The conveyor paths 35, 36, 37 provide means for supplying the goods to be transported 1 to the sorting device and to remove them from the sorting device after completion of sorting. For this purpose, the goods to be conveyed 1 are moved by means of conventional manipulating devices (not shown) between the different conveyor paths 35, 36, 37 and the supply and removal conveyors 10, 20.

Figure 12:
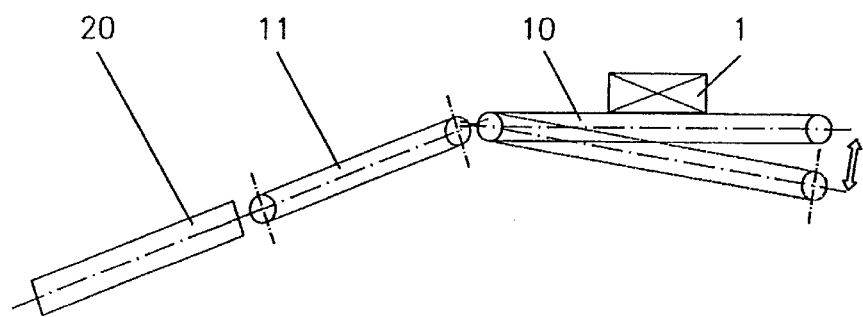
FIG. 12 shows schematically a side view of a supply conveyor and a removal conveyor.

FIG. 12 shows schematically a side view of a partial unit of a sorting device comprised of a supply conveyor 10, 11 and a removal conveyor 20. The supply conveyor 10 has an adjustable incline. The removal conveyor 20 has a transverse slant which corresponds to the incline of the end portion 11 of the supply conveyor 10.

Figure 13:
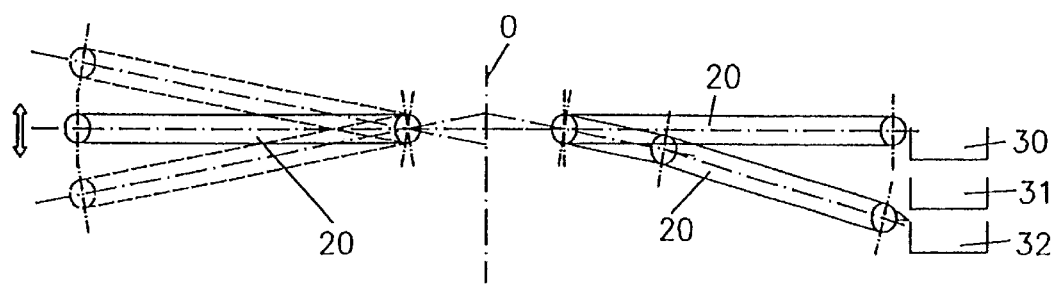
FIG. 13 shows schematically a side view of two removal conveyors with adjustable incline.

FIG. 13 shows, also only schematically, a further partial device. Two removal conveyors 20 rotating about the central axle 0 are shown whose incline can be varied in a controlled fashion. This makes it possible to transfer goods to the removal locations 30, 31, 32 arranged above one another in a directed manner.

Figure 14:
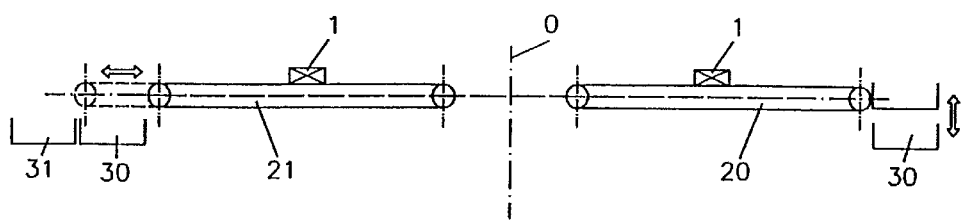
FIG. 14 shows schematically a side view of two removal conveyors with changeable length or height.

FIG. 14 show schematically a side view of two removal conveyors 20, 21 rotating about the central axle 0. A height-adjustable removal location 30 is correlated with the right removal conveyor 20. Two concentric removal locations 30, 31 are correlated with the left removal conveyor 21. In order to be able to transfer goods to both of them in a directed manner, the length of the removal conveyor 21 can be telescopically changed.

Figure 15:
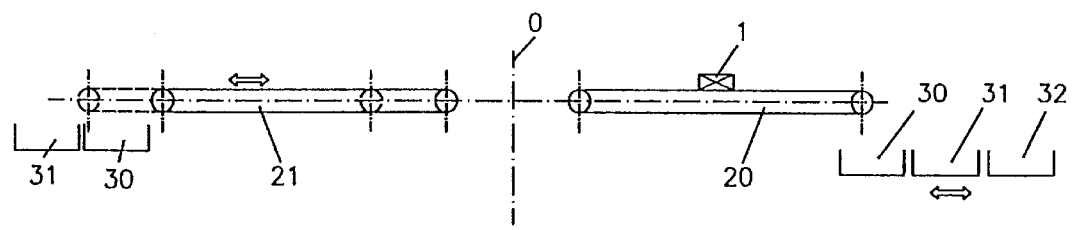
FIG. 15 shows schematically a side view of two removal conveyors in connection with a plurality of removal locations.

FIG. 15 show schematically a side view of two further removal conveyors 20, 21. The concentric removal locations 30, 31, 32 are correlated with the right removal conveyor 20 and are radially movable so that the goods to be sorted 1 can be transferred in a directed manner to one of the removal locations 30, 31, 32.

The left removal conveyor 21, on the other hand, is radially movable, so that here the goods to be sorted can be transferred in a directed manner to one of the concentric removal locations 30, 31.

Figure 16:
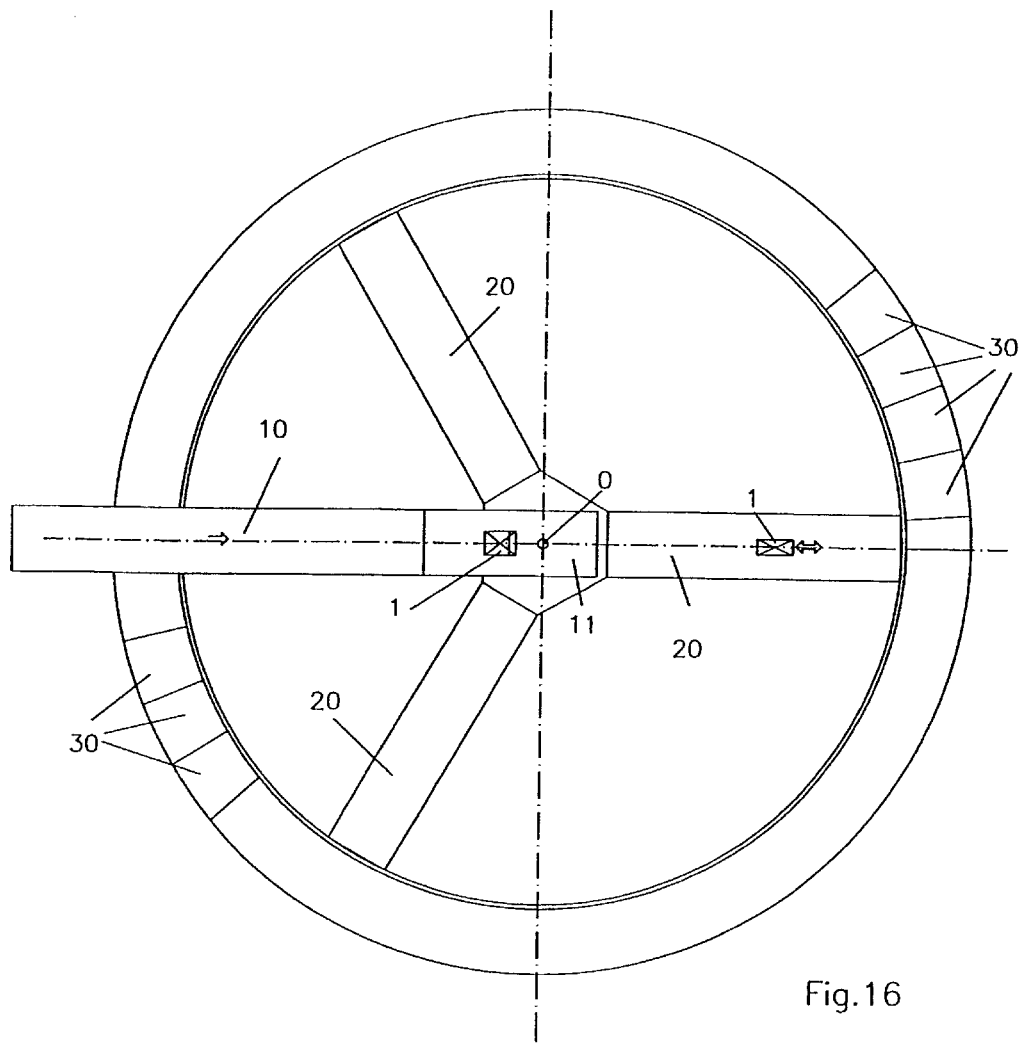
FIG. 16 shows a plan view onto a seventh rotating sorting device in which the supply conveyor and the removal conveyor are aligned.
Figure 17:
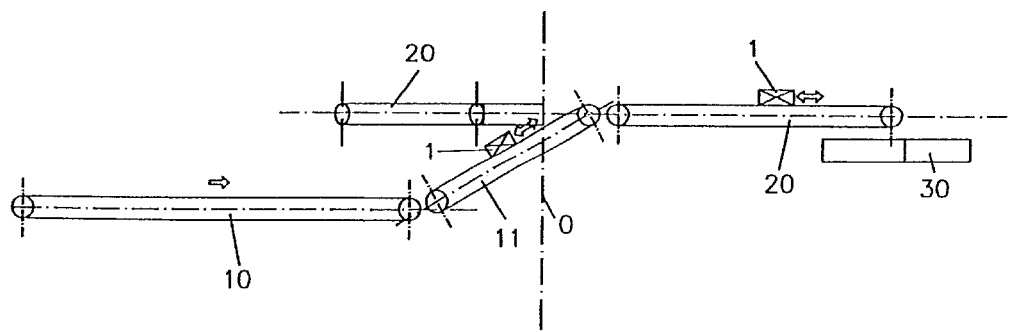
FIG. 17 show schematically a side view of the sorting device of FIG. 16.

FIG. 16 shows a plan view onto a seventh sorting device. It has three rotating removal conveyors 20 rotating about the central axle 0 which transfer the goods to be sorted 1 into one of the removal locations 30. As can be seen in the side view of FIG. 17, the supply conveyor 10 is arranged in the plane below the plane of the removal conveyor 20. The end portion 11 of the supply conveyor 10 thus is inclined upwardly to the plane of the removal conveyor 20. The transfer of the goods to be sorted 1 takes place in the area 11 of the central axle as soon as the longitudinal axes of the supply conveyor 10, 11 and of the removal conveyor 20 are aligned with one another.

Figures 18, 19:
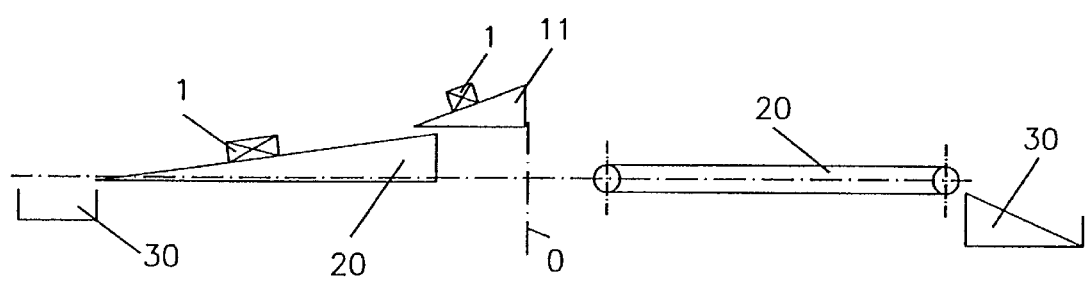
FIG. 18 is a schematic side view of a supply conveyor and a removal conveyor, formed as slides.
FIG. 19 is a schematic side view of a removal conveyor with a removal location embodied as a slide.

FIG. 18 show schematically a side view of the supply conveyor 10, 11, removal conveyor 20, and removal locations 30. The supply conveyor 11 and removal conveyor 20 are embodied as slides. This construction is characterized by simplicity.

FIG. 19 show schematically the side view of a removal conveyor 20 having correlated therewith a removal location 30 in the form of a slide.

What is claimed is:

1. A rotating sorting device for sorting packaged goods, the device comprising:
   at least one linear supply conveyor;
   a plurality of removal locations arranged circularly about a central axle;
   at least four linear removal conveyors positioned between the central axle and the removal locations and arranged substantially radially;
   wherein the linear removal conveyors are configured to rotate continuously about the central axle;
   wherein the at least one linear supply conveyor is arranged substantially radially and positioned above or below the linear removal conveyor;
   wherein the at least one linear supply conveyor has an end portion in a conveying direction of the linear supply conveyor, the end portion having an incline extending downwardly or upwardly toward the linear removal conveyors;
   a transfer location between the at least one linear supply conveyor and the linear removal conveyors, wherein the transfer location is in the vicinity of the central axle, wherein the linear supply conveyor and the linear removal conveyor are positioned approximately at a right angle to one another at the transfer location;
   wherein a speed of the linear removal conveyors at which the linear removal conveyors move relative to the at least one linear supply conveyor at the transfer location is identical to a conveying speed of the linear supply conveyor;
   a first sensor arranged on the at least one linear supply conveyor configured to detect features of the packaged goods to be sorted;
   a computing unit configured to compute the removal location for the packaged goods based on the features detected by the sensor;
   second sensors arranged on the at least one linear supply conveyor and the linear removal conveyors, wherein the second sensors are configured to detect an actual position of the packaged goods on the at least one linear supply conveyor and the linear removal conveyors and to signal the actual position to the computing unit;
   a third sensor configured to signal an actual angular position of the rotating linear removal conveyors to the computing unit; and
   a control unit configured to synchronize the transfer of the packaged goods from the at least one linear supply conveyor to the removal conveyors, to stop the linear removal conveyors before the packaged goods have reached the end of the linear removal conveyors, and to start the linear removal conveyors again when the computed removal location has been reached.

2. The rotating sorting device according to claim 1, wherein the linear removal conveyor in the area of the transfer location has a transverse slant and wherein the transverse slant matches the incline of the end portion of the at least one linear supply conveyor.

3. The rotating sorting device according to claim 1, wherein the end portion of the at least one linear supply conveyor is a slide.

4. The rotating sorting device according to claim 1, wherein the linear removal conveyors are a conveyor belt or a roller table or a slide.

5. The rotating sorting device according to claim 1, wherein the at least one linear supply conveyor is a conveyor belt or a roller table or a slide.

6. The rotating sorting device according to claim 1, wherein the removal locations are arranged on concentric circles about the central axle and wherein the linear removal conveyors have different lengths.

7. The rotating sorting device according to claim 1, wherein the removal locations are arranged on concentric circles about the central axle and wherein the linear removal conveyors are configured to be controllably telescoped in order to reach the removal locations.

8. The rotating sorting device according to claim 1, wherein the removal locations are arranged on concentric circles about the central axle and wherein the linear removal conveyors are configured to be controllably linearly moveable in order to reach the removal locations.

9. The rotating sorting device according to claim 1, wherein the removal locations are arranged on different levels and wherein the linear removal conveyors have different inclines.

10. The rotating sorting device according to claim 1, wherein the removal locations are arranged on different levels and wherein the at least one linear supply conveyor or the linear removal conveyors are configured to controllably change an incline thereof.

11. The rotating sorting device according to claim 1, wherein the removal locations are arranged on different levels and wherein the at least one linear supply conveyor and the linear removal conveyors are configured to controllably change an incline thereof.

12. The rotating sorting device according to claim 1, wherein the removal locations rotate controllably about the central axle.

13. The rotating sorting device according to claim 1, comprising an annular conveyor path on which the removal locations are positioned.

14. The rotating sorting device according to claim 1, wherein the removal locations are formed as at least one annular conveyor path.

15. The rotating sorting device according to claim 14, wherein several annular conveyor paths are arranged concentrically.

16. The rotating sorting device according to claim 1, further comprising at least one tangential conveyor.

17. A sorting arrangement for sorting packaged goods, the device comprising at least two rotating sorting device each comprising:
   at least one linear supply conveyor;
   a plurality of removal locations arranged circularly about a central axle;
   at least four linear removal conveyors positioned between the central axle and the removal locations and arranged substantially radially;
   wherein the linear removal conveyors are configured to rotate continuously about the central axle;
   wherein the at least one linear supply conveyor is arranged substantially radially and positioned above or below the linear removal conveyor;
   wherein the at least one linear supply conveyor has an end portion in a conveying direction of the linear supply conveyor, the end portion having an incline extending downwardly or upwardly toward the linear removal conveyors;
   a transfer location between the at least one linear supply conveyor and the linear removal conveyors, wherein the transfer location is in the vicinity of the central axle, wherein the linear supply conveyor and the linear removal conveyor are positioned approximately at a right angle to one another at the transfer location;

wherein a speed of the linear removal conveyors at which the linear removal conveyors move relative to the at least one linear supply conveyor at the transfer location is identical to a conveying speed of the linear supply conveyor;

a first sensor arranged on the at least one linear supply conveyor configured to detect features of the packaged goods to be sorted;

a computing unit configured to compute the removal location for the packaged goods based on the features detected by the sensor;

second sensors arranged on the at least one linear supply conveyor and the linear removal conveyors, wherein the second sensors are configured to detect an actual position of the packaged goods on the at least one linear supply conveyor and the linear removal conveyors and to signal the actual position to the computing unit;

a third sensor configured to signal an actual angular position of the rotating linear removal conveyors to the computing unit;

a control unit configured to synchronize the transfer of the packaged goods from the at least one linear supply conveyor to the removal conveyors, to stop the linear removal conveyors before the packaged goods have reached the end of the linear removal conveyors, and to start the linear removal conveyors again when the computed removal location has been reached; and wherein at least one of the transfer locations of one of the two sorting devices, which at least one transfer location is comprised of a conveyor belt or a roller table or a slide, transfers the packaged goods to one of the supply conveyors of the other one of the two sorting devices.

18. The sorting arrangement according to claim 17, wherein two of the sorting devices are positioned adjacent to one another.

19. The sorting arrangement according to claim 17, wherein two of the sorting devices are positioned one above the other.

* * * * *